May 31, 1927.

W. B. FLANDERS 1,630,737

COUPLING

Filed July 18, 1924

WITNESSES:

W. B. Flanders
INVENTOR

BY D. C. Davis
ATTORNEY

Patented May 31, 1927.

1,630,737

UNITED STATES PATENT OFFICE.

WARREN B. FLANDERS, OF PHILADELPHIA, PENNSYLVANIA, ASSIGNOR TO WESTINGHOUSE ELECTRIC & MANUFACTURING COMPANY, A CORPORATION OF PENNSYLVANIA.

COUPLING.

Application filed July 18, 1924. Serial No. 726,779.

My invention relates to shaft couplings, particularly to shaft couplings of the flexible type, and it has for an object to provide apparatus of the character designated which shall embody effective means for damping the torsional vibrations which are often present in connected shafting.

Figure 1:
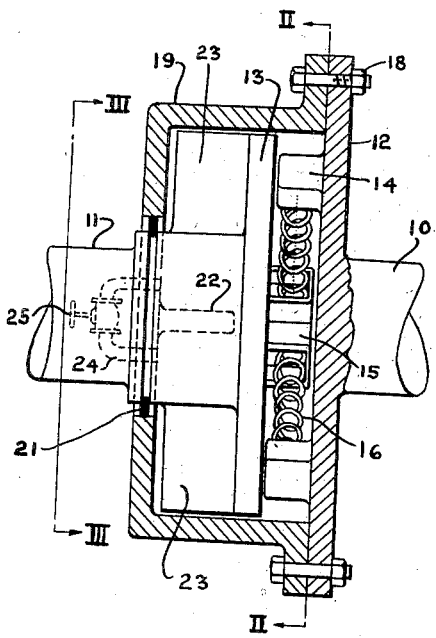
Figure 2:
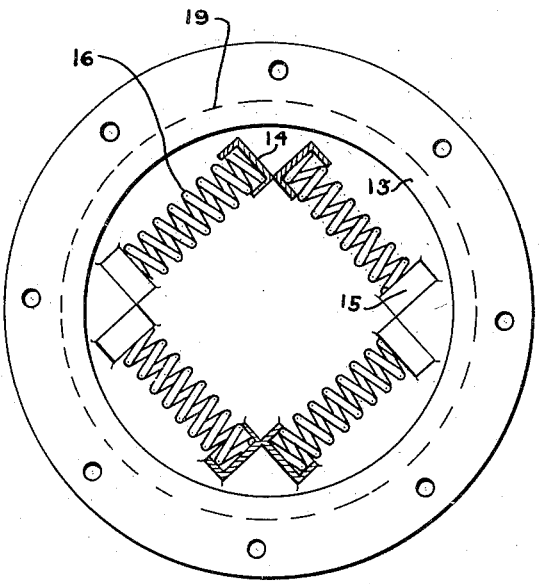
Figure 3:
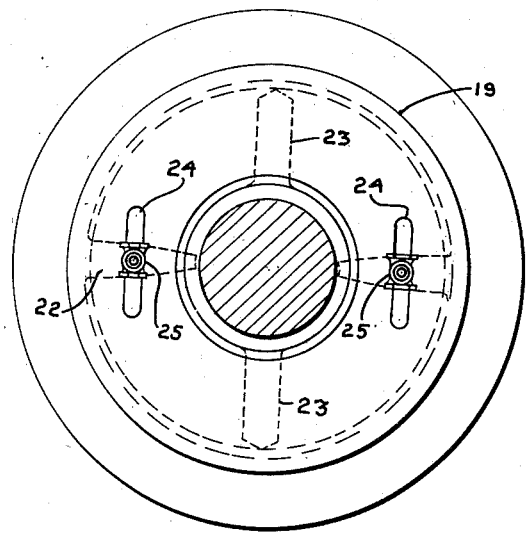
Figure 4:
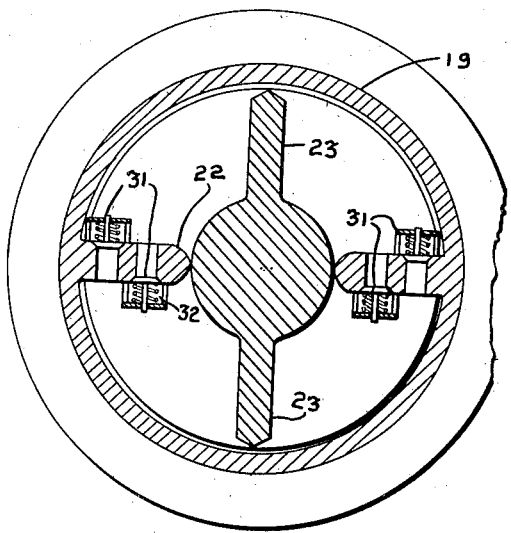

This and other objects, which will be made apparent throughout the further description of my invention, may be attained by the employment of the apparatus hereinafter described and illustrated in the accompanying drawing in which Fig. 1 is a longitudinal sectional elevation of one form of my coupling; Figs. 2 and 3 are transverse sectional elevations taken respectively on the lines II—II and III—III of Fig. 1 and Fig. 4 is a transverse sectional elevation of another embodiment of my invention.

In certain types of rotating machinery, such as the geared turbine drives employed in ship propulsion or the rotary pumping systems employed in dredging operations, the machinery is submitted to excessive strains because of the torsional vibrations set up in the connected shafting by sudden changes in load or by other variations in rotational velocity. Continued operation under these conditions may result in injuring the apparatus or seriously curtailing its useful life. By my invention, fluid-pressure means are provided within the shaft couplings for so damping or absorbing any vibrations which may be set up in one shaft section that they are confined or localized in that section and are not transmitted to the adjacent sections. In this manner, the reliability of the machinery is considerably improved and its useful life prolonged.

Referring to the drawing for a more detailed description of my invention, I show a driving shaft 10 and a driven shaft 11 provided with respective coupling members 12 and 13. Provided in each of the coupling members 12 and 13 is a plurality of spring retainers 14 and 15 respectively which cooperate in pairs to receive driving springs 16, the latter being installed under an initial compression. Secured to the driving member 12, as by bolts 18, is a casing 19 for retaining a liquid. A suitable packing maintaining member 21 is secured in the driving shaft 11 and engages the casing 19 for preventing leakage of fluid therefrom. Provided in the casing 19 are two radially-disposed damping vanes 22 actuated by the driving shaft 10. Secured to the driven shaft 11 and the coupling member 13 are two damping vanes 23 which are similar to the driving damping vanes and are normally disposed thereto. The driving damping vanes 22 and the driven damping vanes 23 extend radially inward and outward respectively, effecting a very small clearance with the driven shaft 11 and the casing 19. Two conduits 24 are provided for establishing communication with the casing 19 on opposite sides of each of the damping vanes 22. A valve 25, which is preferably of the orifice or needle type, is provided in each of the conduits 24 for altering the area of flow.

The operation of the above embodiment of my invention is as follows: Power is transmitted by the driving shaft 10 through the driving springs 16 to the driven shaft 11. The construction is such that any mis-alignment which may take place between the shafts under ordinary operating conditions is freely permitted. The strength and scale of the springs 16 is sufficient for transmitting the designed load without undue flexing. Any variation in load will cause a corresponding flexing of the springs, and the coupling members 12 and 13 consequently rotate relatively to each other. The relative movement of the driving damping vanes 22 with respect to the driven damping vanes 23 results in displacing a quantity of the liquid which is present in two of the segments formed by the damping vanes and the circular casing 19. The liquid displaced is conveyed by the conduits 24 into the two remaining segments. The rate of displacement of the liquid is controlled by the setting of the valves 25, which is generally such that the relative rotational movements of the coupling members 12 and 13 are gradually arrested and the vibratory impulses absorbed.

While I have described my invention as being especially adapted for use in geared turbine drives or rotary pumping systems, it is to be understood that its use is not confined solely thereto, and that it may be advantageously employed for coupling together any two rotating members. Further-more, the damping mechanism may, if desired, be entirely dis-associated from the coupling mechanism.

In Fig. 4, I show another embodiment of my invention in which two relief valves 31 are provided in each of the damping vanes 22 for permitting passage of the liquid. The valves 31 are normally held in a closed position by suitable springs 32. The springs 32 are so designed that the valves are allowed to open upon a predetermined increase in liquid pressure as effected by a relative movement of the damping vanes 22 and 23. The flow of the liquid is restricted and the torsional vibrations are damped, whereupon the driving springs 16 hold the driving and driven members in a relative position corresponding to the average torque.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claim.

What I claim is:—

In a coupling, the combination of a driving member, a driven member, resilient power-transmitting means interposed between the driving and driven members, a casing containing fluid, damping vanes associated respectively with the driving and driven members and disposed within the casing, means communicating with the casing for by-passing fluid around the damping vanes, and means provided in said communicating means for regulating the quantity of flow.

In testimony whereof, I have hereunto subscribed my name this sixteenth day of July, 1924.

WARREN B. FLANDERS.